United States Patent [19]

Nelson et al.

[11] Patent Number: 5,574,631
[45] Date of Patent: Nov. 12, 1996

[54] MAGNETIC FILTER

[75] Inventors: Robert J. Nelson, Orlando; Jianhua Bian, Winter Park, both of Fla.

[73] Assignee: Westinghouse Electric Corporation, Pittsburgh, Pa.

[21] Appl. No.: 429,379

[22] Filed: Apr. 26, 1995

[51] Int. Cl.$^6$ .................................................. H02M 1/12
[52] U.S. Cl. .................................. 363/40; 307/58
[58] Field of Search ........................ 363/39, 40; 307/58

[56] References Cited

U.S. PATENT DOCUMENTS

| | | | |
|---|---|---|---|
| Re. 28,986 | 9/1976 | Heinrich et al. | 321/5 |
| 3,628,123 | 12/1971 | Rosa et al. | 321/9 R |
| 3,792,286 | 2/1974 | Meier | 307/58 |
| 3,876,923 | 4/1975 | Humphrey et al. | 321/27 R |
| 4,195,334 | 3/1980 | Perry et al. | 363/44 |
| 4,366,532 | 12/1982 | Rosa et al. | 363/45 |
| 4,870,557 | 9/1989 | Stacey | 363/43 |
| 4,967,334 | 10/1990 | Cook et al. | 363/40 |
| 4,975,822 | 12/1990 | Lipman | 363/40 |
| 5,166,597 | 11/1992 | Larsen et al. | 323/215 |
| 5,337,227 | 8/1994 | Stacey et al. | 363/71 |

OTHER PUBLICATIONS

Mori et al., *Development of a Large Static VAR Generator Using Self-Commutated Inverters for Improving Power System Stability*, pp. 1–7, Jan. 1992, IEEE, 92 WM 165-1 PWRS.

*Primary Examiner*—Stuart N. Hecker

[57] ABSTRACT

A magnetic filter filters substantially all of the harmonic frequency currents from a plural-phase power circuit. The power circuit may have three power lines which conduct three currents in a first current set and three power lines which conduct three currents in a second current set. The second current set is displaced from the first current set by a predetermined phase shift. The current sets have a fundamental frequency and a plurality of harmonic frequencies of the fundamental frequency. The magnetic filter may include two transformers each of which has three windings. A first transformer may receive two currents from the first current set and one current from the second current set. A second transformer may receive one current from the first current set and two currents from the second current set. The magnetic filter may also include a phase-shifting coupling transformer having six input phases for receiving the six currents. The transformer may also have three output phases which conduct an output current set. The power circuit may include three power lines for the first current set and three power lines for the second current set. Alternatively, the power circuit may include a first inverter having three power lines for conducting three currents in the first current set and a second inverter having three power lines for conducting three currents in the second current set.

18 Claims, 4 Drawing Sheets

MAGNETIC FILTER

BACKGROUND OF THE INVENTION

1. Field of the Invention

This invention is directed to a filter for a power circuit, and more particularly to a transformer-based magnetic filter for filtering harmonic frequency currents from the power circuit. The invention is also directed to a transformer-based magnetic filter for synthesizing a waveform with minimal harmonic content from multiple plural-phase inputs.

2. Background of Information

Power generation and distribution systems generally include plural power lines (e.g., three phases) which provide alternating current power from a power source (e.g., a generator, a feeder, an inverter, etc.) to a plural-phase load. Each of the plural power lines includes current and voltage waveforms which have a uniform phase shift (e.g., 120°) between sequential phases (e.g., phase A to phase B, phase B to phase C, or phase C to phase A). Each of these waveforms operates at a fundamental frequency (e.g., 50 Hz, 60 Hz, 400 Hz, etc.). The power generation and distribution system typically introduces harmonics of the fundamental frequency and, thus, distorts such current and voltage waveforms.

*Development of a Large Static VAR Generator Using Self-Commutated Inverters for Improving Power System Stability*, 92 WM 165-1 PWRS, January 1992, discloses a static VAR generator system. The generator system includes eight unit inverters which have 48 output voltages of the same wave shape. The 48 output voltages are offset by a 7.5 degree phase angle. These output voltages are combined by a multiple transformer having 8 secondary windings and a main transformer in order to form a 48 pulse wave shape having reduced output current harmonics.

In a three-phase system having two three-phase inverters which are offset by 30 degrees, it is known to utilize three three-winding transformers between the inverters and a step-up transformer in order to eliminate a particular set of harmonics. However, the step-up transformer requires a fixed 30 degree phase shift and the three-winding transformers require a specific √3:1:1 turns-ratio.

There is a need, therefore, for a simplified apparatus which filters harmonic currents from a power distribution system having dual three-phase inverters.

There is a more particular need for such an apparatus which does not require a specific phase shift in a step-up transformer or between the inverters.

There is another more particular need for such an apparatus which does not require a specific turns-ratio in a transformer.

There is yet another more particular need for such an apparatus which reduces the requisite number of transformers.

There is still another need for an apparatus which synthesizes a waveform with minimal harmonic content from multiple plural-phase inputs.

SUMMARY OF THE INVENTION

These and other needs are satisfied by the invention which is directed to a magnetic filter for a power circuit including a first plurality of current sets. The current sets have a fundamental frequency and a second plurality of harmonic frequencies of the fundamental frequency. Each of the current sets is conducted by a third plurality of phases and is displaced from a corresponding one of the current sets by a predetermined phase shift. The magnetic filter may include transformers of the first plurality, each of which has windings of the third plurality for receiving at least one current from each of the current sets. The magnetic filter may also include a phase shift elimination mechanism for eliminating the phase shift having a plurality of input phases of the first plurality times the third plurality for receiving each of the currents of the current sets. The phase shift elimination mechanism also has output phases of the third plurality which conduct an output current set. The transformers of the first plurality filter substantially all of the harmonic frequencies from the output current set.

Alternatively, a magnetic filter may be provided for a three-phase power circuit having two inverters, including a first inverter having three power lines which conduct three currents in a first current set, and including a second inverter having three power lines which conduct three currents in a second current set. The second current set is displaced from the first current set by a predetermined phase shift. The current sets have a fundamental frequency and a second plurality of harmonic frequencies of the fundamental frequency. The magnetic filter may include two transformers each of which has three windings. A first transformer may receive two currents from the first current set and one current from the second current set. A second transformer may receive one current from the first current set and two currents from the second current set. The magnetic filter may also include a phase shift elimination mechanism having six input phases for receiving the two current sets from the three windings of each of the two transformers and having three output phases which conduct an output current set. The two transformers filter substantially all of the harmonic frequencies from the output current set.

Alternatively, a magnetic filter may be provided for a three-phase power circuit having three power lines which conduct three currents in a first current set and also having three power lines which conduct three currents in a second current set. The three currents in the first current set have a fundamental frequency and a plurality of harmonic frequencies of the fundamental frequency. The second current set is displaced from the first current set by a predetermined phase shift. The magnetic filter may also include two transformers each of which has three windings. One of the transformers receives two currents from the first current set and one current from the second current set. The other transformer receives one current from the first current set and two currents from the second current set. The magnetic filter may further include a phase shift elimination mechanism having six input phases for receiving the two current sets from the three windings of each of the two transformers and having three output phases which conduct an output current set. The two transformers filter substantially all of the harmonic frequencies from the output current set.

DESCRIPTION OF THE PREFERRED EMBODIMENT

Figure 1:
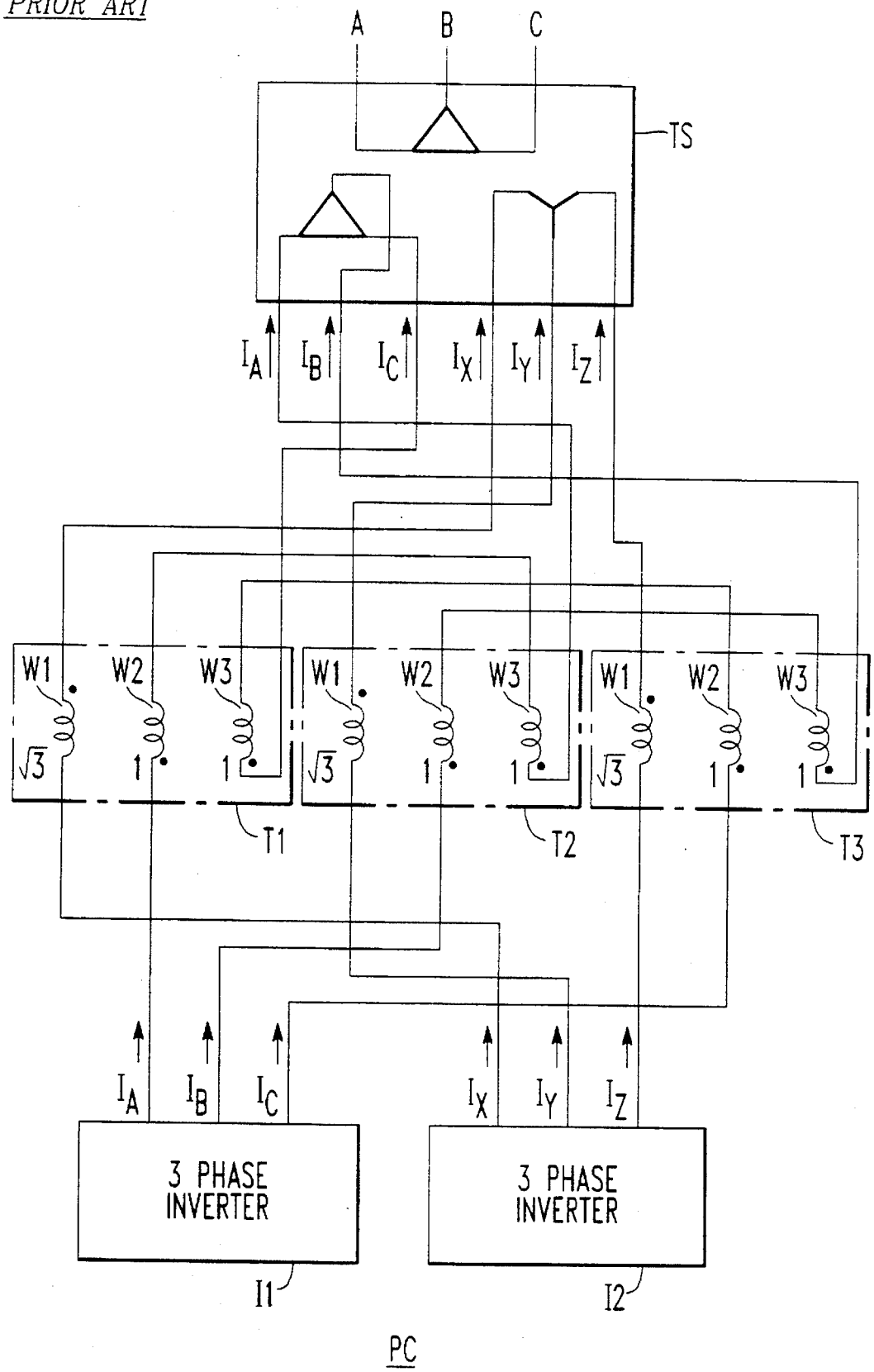
FIG. 1 is a schematic diagram of a prior art power circuit having three three-phase transformers.

FIG. 1 illustrates a prior art three-phase power circuit PC having two three-phase inverters I1,I2; three three-winding, common-core transformers T1,T2,T3; and a step-up 30 degree phase-shifting coupling transformer TS. The first inverter I1 produces a first set of currents $I_A, I_B, I_C$ and the second inverter I2 produces a second set of currents $I_X, I_Y, I_Z$. The second set of currents lags the first set of currents by a constant 30 degree phase shift. The three windings W1,W2,W3 of each of the transformers T1,T2,T3 have a turns ratio of √3:1:1 and a winding orientation which is illustrated by a dot at one end of each of the windings W1,W2,W3.

The step-up transformer TS includes a first primary having three inputs in a "Δ" configuration for the first current set $I_A, I_B, I_C$ and a second primary having three inputs in a "Y" configuration for the second current set $I_X, I_Y, I_Z$. The transformer TS provides a fixed 30 degree phase shift and, hence, eliminates the phase shift between the two current sets. The transformer TS also includes a secondary having three output power lines A,B,C in a "Δ" configuration in order to provide a three-phase system voltage. The transformers T1,T2,T3 generally block all harmonics of a fundamental frequency of the two current sets with the exception of the "12K±1" order of the harmonic current where "K" is an integer which is greater than 0.

As illustrated in FIG. 1, the transformer TS receives the second current set $I_X, I_Y, I_Z$ directly from the first winding W1 of each of the transformers T1,T2,T3. In contrast, each of the currents of the first current set $I_A, I_B, I_C$ flows through one winding (either W2 or W3) of two of the transformers T1,T2,T3. For example, $I_A$ flows through winding W2 of transformer T1 and through winding W3 of transformer T2.

Figure 2:
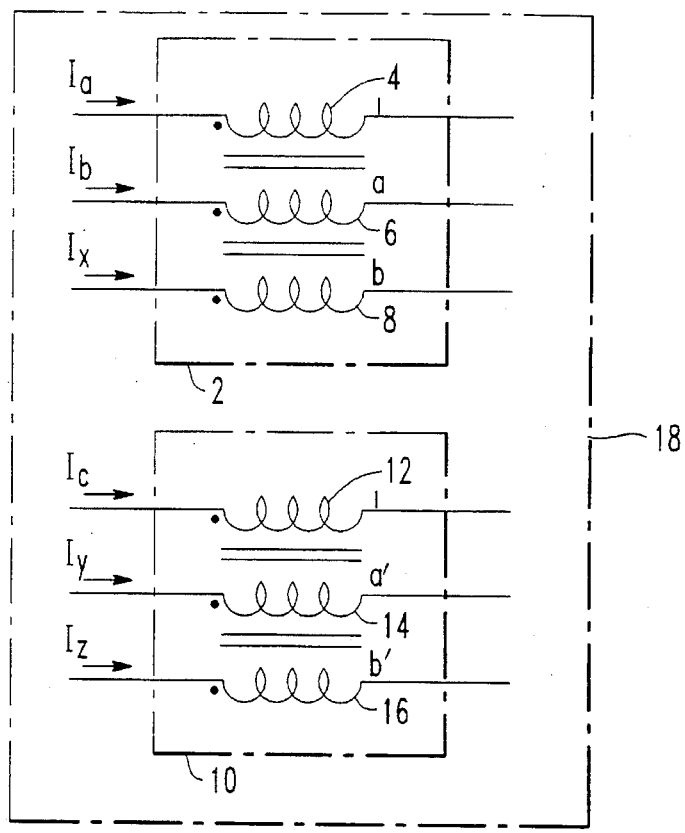
FIG. 2 is a schematic diagram of two three-phase transformers in accordance with an embodiment of the invention.

Referring now to FIG. 2, Equations 1A–1C (for a first set of currents $I_a, I_b$ and $I_c$) and Equations 1D–1F (for a second set of currents $I_x, I_y$ and $I_z$) represent, in phasor and standard form, two sets of three-phase balanced sinusoidal positive sequence currents of peak magnitude √2I. The second set of currents is displaced from the first set of currents by α degrees.

$$I_a = I(0° = \sqrt{2}\ I\cos\omega t \quad \text{Eq. (1A)}$$

$$I_b = I(-120° = \sqrt{2}\ I\cos(\omega t - 120°) \quad \text{Eq. (1B)}$$

$$I_c = I(120° = \sqrt{2}\ I\cos(\omega t + 120°) \quad \text{Eq. (1C)}$$

$$I_x = I(-\alpha° = \sqrt{2}\ I\cos(\omega t - \alpha°) \quad \text{Eq. (1D)}$$

$$I_y = I(-120° - \alpha°) = \sqrt{2}\ I\cos(\omega t - 120° - \alpha°) \quad \text{Eq. (1E)}$$

$$I_z = I((120° - \alpha°) = \sqrt{2}\ I\cos(\omega t + 120° - \alpha°) \quad \text{Eq. (1F)}$$

Where:

ω=2πf;

f=a fundamental frequency, such as a power circuit frequency; and t=time.

Two arbitrary currents ($I_a$ and $I_b$) from the first set of currents and one arbitrary current ($I_x$) from the second set of currents are fed into a three-winding, common-core transformer 2 of FIG. 2. The transformer 2 has three windings 4,6,8 which have a turns ratio of 1:a:b and a winding orientation which is illustrated by the three dots of the upper half of FIG. 2. In other words, the transformer 2 has a turns ratio between the second winding 6 and the first winding 4 of "a" and, also, has a turns ratio between the third winding 8 and the first winding 4 of "b". The turns ratio 1:a:b, as included in Equations 2A–2B, is selected in order that the transformer 2 has an ampere-turns balance for the fundamental frequency, f.

$$I_a + aI_b + bI_x = 0 \quad \text{Eq. (2A)}$$

$$1<0° + a<-120° + b<-\alpha° = 0 \quad \text{Eq. (2B)}$$

Alternative forms of Equations 2A–2B are provided by Equations 3 and 4.

$$a\cos(-120°) + b\cos(-\alpha°) = -1 \quad \text{Eq. (3)}$$

$$a\sin(-120°) + b\sin(-\alpha°) = 0 \quad \text{Eq. (4)}$$

Using the well known angle-sum relationship of sin (A+B)=sinAcosB+cosAsinB, and noting that cos (−A)=cos (A) and that sin(−A)=−sin(A), the solution of Equations 3–4 for "a" and "b" is provided by Equations 5 and 6, respectively, it being understood that a negative turns ratio (e.g., "a" and/or "b" being negative) indicates that the corresponding dot of the upper half of FIG. 2 is on the opposite side of the transformer 2.

$$a = \frac{\sin\alpha°}{\sin(120° - \alpha°)} \quad \text{Eq. (5)}$$

$$b = \frac{\sin 120°}{-\sin(120° - \alpha°)} = \frac{-\sqrt{3}}{2\sin(120° - \alpha°)} \quad \text{Eq. (6)}$$

In the exemplary embodiment, the turns ratio 1:a:b of the transformer 2 results in an ampere-turns balance of the equal magnitude (i.e., √2I) currents $I_a$, $I_b$ and $I_x$. Therefore, the apparent reactance of the transformer 2 is the transformer leakage reactance. Without such ampereturns balance, the apparent reactance of the transformer 2 is approximately the magnetizing reactance which is approximately 1000 times larger than the leakage reactance (e.g., approximately 15% per-unit). Preferably, the transformer 2 has a relatively low leakage reactance and a relatively high magnetizing reactance and, hence, approximates an ideal transformer.

Equations 7A–7C represent, in phasor form, the "n"th harmonic currents of the fundamental currents, $I_a$, $I_b$ and $I_x$.

$$I_{a_n} = |I_{a_n}| < 0° \quad \text{(Eq. 7A)}$$

$$I_{b_n} = |I_{b_n}| < (-120°*n) \quad \text{Eq. (7B)}$$

$$I_{x_n} = |I_{x_n}| < (-\alpha°*n) \quad \text{Eq. (7C)}$$

Where:

$|I_{a_n}| = |I_{b_n}| = |I_{x_n}| = I_n$ for a balanced three-phase set of currents; and n=the integral order of the harmonic current.

Equation 8, also in phasor form, provides the apparent reactance, $X_n$, of the transformer 2 to the "n"th harmonic of the fundamental currents, $I_a$, $I_b$ and $I_x$.

$$X_n = nX_1(1 \angle 0° + a \angle (-n*120°) + b \angle (-n*\alpha°))/3) + nX_m((1 \angle 0° + a \angle (-n*120°) + b \angle (-n*\alpha°))/3) \quad \text{Eq. (8)}$$

Where:

$X_1$=leakage reactance to fundamental current flow, $\Omega$/phase; and $X_m$=magnetizing reactance to fundamental current flow, $\Omega$/phase.

As discussed above, normally $X_m$ is much greater than $X_1$. Therefore, $X_n$ will be extremely high unless the ampere-turns balance requirement of Equation 9, as stated in phasor form, is satisfied.

$$1 \angle 0° + a \angle (-120°n) + b \angle (-n\alpha°) = 0 \quad \text{Eq. (9)}$$

Alternative forms of Equation 9 are provided by Equations 10 and 11.

$$a\cos(-120°n) + b\cos(-n\alpha°) = -1 \quad \text{Eq. (10)}$$

$$a\sin(-120°n) + b\sin(-n\alpha°) = 0 \quad \text{Eq. (11)}$$

Using the above-stated angle-sum relationship, the solution of Equations 10–11 for "a" and "b" is provided by Equations 12 and 13, respectively, it being understood that a negative turns ratio indicates that the corresponding dot of the upper half of FIG. 2 is on the opposite side of the transformer 2.

$$a = \frac{\sin n\alpha°}{\sin(n(120° - \alpha°))} \quad \text{Eq. (12)}$$

$$b = \frac{\sin 120°n}{-\sin(n(120° - \alpha°))} \quad \text{Eq. (13)}$$

Equation 14 equates Equation 12 to Equation 5. Similarly, Equation 15 equates Equation 13 to Equation 6.

$$a = \frac{\sin \alpha°}{\sin(120° - \alpha°)} = \frac{\sin n\alpha°}{\sin(n(120° - \alpha°))} \quad \text{Eq. (14)}$$

$$b = \frac{\sin 120°}{-\sin(120° - \alpha°)} = \frac{\sin 120°n}{-\sin(n(120° - \alpha°))} \quad \text{Eq. (15)}$$

Where:

$$n = \left(\frac{360°}{\alpha°}\right) * K \pm m; \text{ and}$$

K and m are arbitrary integers.

Equations 16 and 17 are satisfied if and only if m=1. The ampere-turns balance requirement is only satisfied for the "M"th harmonics of Equation 18. All harmonic currents of the fundamental currents, $I_a$, $I_b$ and $I_x$, other than M, are blocked by the magnetizing reactance of the transformer 2.

$$\frac{\sin \alpha°}{\sin(120° - \alpha°)} = \frac{\sin\left[\left(\frac{360°}{\alpha°} * K \pm m\right)\alpha°\right]}{\sin\left[\left(\frac{360°}{\alpha°} * K \pm m\right)(120° - \alpha°)\right]} \quad \text{Eq. (16)}$$

$$\frac{\sin 120°}{-\sin(120° - \alpha°)} = \quad \text{Eq. (17)}$$

$$\frac{\sin\left[120°\left(\frac{360°}{\alpha°} * K \pm m\right)\right]}{-\sin\left[\left(\frac{360°}{\alpha°} * K \pm m\right)(120° - \alpha°)\right]}$$

$$M = \left(\frac{360°}{\alpha°}\right) * K \pm 1 \quad \text{Eq. (18)}$$

Where:

K and M are integers; and $0° \leq |\alpha| \leq 360°$

The integer K must satisfy the requirement of Eq. (18A):

$$K = \pm \left| \frac{L\alpha°}{120° - \alpha°} \right| \quad \text{Eq. (18A)}$$

where L is any integer.

Exceptions to Eq. 18 occur at integral multiples of 60° (0°, 60°, 120°, 180°, etc). If $\alpha$ is irrational, Eq. 18 will not be satisfied for any non-zero values of K, so the only value of M which will satisfy Eq. 18 is ±1, which corresponds to the fundamental frequency.

As further illustrated by FIG. 2, a second three-winding, common-core transformer 10 is provided for currents $I_c$, $I_y$ and $I_z$. The transformer 10 has three windings 12,14,16 which have a turns ratio of 1:a':b' and a winding orientation which is illustrated by the three dots of the lower half of FIG. 2. In other words, the transformer 10 has a turns ratio between the second winding 14 and the first winding 12 of "a'" and, also, has a turns ratio between the third winding 16 and the first winding 12 of "b'".

As a general rule, the turns ratio (i.e., 1:a':b') for the second transformer 10 is not the same as the turns ratio (i.e., 1:a:b) for the first transformer 2. However, an exception to this general rule occurs if the first transformer 2 has input currents $I_1, I_2, I_3$, the second transformer 10 has input currents $I_4, I_5, I_6$, and the currents $I_a$–$I_c$ and $I_x$–$I_z$ are selected in accordance with Equation 19A.

$$\begin{bmatrix} I_1 I_1^* = I_4^* I_4 \\ I_2 I_1^* = I_5^* I_4 \\ I_3 I_1^* = I_6^* I_4 \end{bmatrix} \quad \text{Eq. (19A)}$$

Where:

"*" designates the complex conjugate of a current;

at least one of the currents $I_1$–$I_3$ is from the first set of currents $I_a$–$I_c$; and at least one of the currents $I_1$–$I_3$ is from the second set of currents $I_x$–$I_z$.

Equation 19B is an alternative form of Equation 19A.

$$\begin{bmatrix} I_1 I_1^* = I_4 I_4^* \\ I_2 I_1^* = I_5 I_4^* \\ I_3 I_1^* = I_6 I_4^* \end{bmatrix} \quad \text{Eq. (19B)}$$

Whenever, Equations 19A or 19B apply, then a=a' and b=b', where "a" and "b" are the per unit turns ratios which correspond to $I_2$ and $I_3$, respectively, and "a'" and "b'" are the per unit turns ratios which correspond to $I_5$ and $I_6$, respectively. As illustrated in the balanced three-phase system of FIG. 2, for example, a suitable choice for the transformer 2 are the currents $I_a$, $I_b$ and $I_x$, which leaves the currents $I_c$, $I_y$ and $I_z$ for the transformer 10. In other words, for the transformer 2, two ($I_a$ and $I_b$) of the currents $I_1$–$I_3$ are from the first set of currents and one ($I_x$) of the currents $I_1$–$I_3$ is from the second set of currents. In a related manner, for the transformer 10, one ($I_c$) of the currents $I_4$–$I_6$ is from the first set of currents and two ($I_y$ and $I_z$) of the currents $I_4$–$I_6$ are from the second set of currents.

Figure 3:
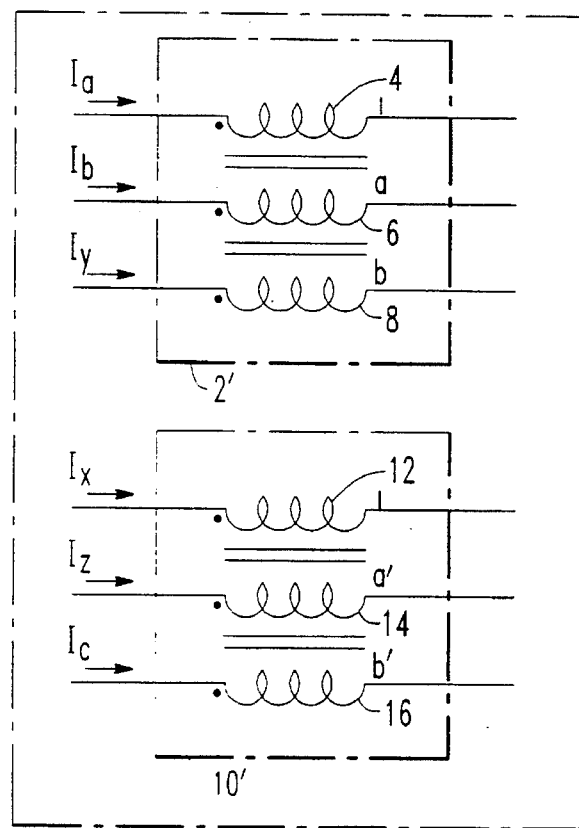
FIG. 3 is a schematic diagram of two three-phase transformers in accordance with an alternative embodiment of the invention.

FIG. 3 illustrates another balanced three-phase system which includes three-winding, common-core transformers 2' and 10'. Transformers 2' and 10' are similar to transformers 2 and 10 with the exception of the selection of the individual currents from the first set of currents $I_a$–$I_c$ and the second set of currents $I_x$–$I_z$. In the exemplary embodiment, two arbitrary currents (e.g., $I_a$ and $I_b$) from the first set and one arbitrary current (e.g., $I_y$) from the second set of currents are fed into the transformer 2' and, hence, the remaining currents ($I_x$, $I_z$ and $I_c$) are fed into the transformer 10'.

Referring to Equations 1A, 1B and 1E, the turns ratio (i.e., 1:a:b) for the transformer 2' is provided by Equation 20.

$$1<0°+a<-120°+b<(-120°-\alpha°)=0 \quad \text{Eq. (20)}$$

This turns ratio, as included in Equation 20, is selected in order that the transformer 2' has an ampereturns balance for the fundamental frequency, f.

Alternative forms of Equation 20 are provided by Equations 21 and 22.

$$a\cos(-120°)+b\cos(-120°-\alpha°)=-1 \quad \text{Eq. (21)}$$

$$a\sin(-120°)+b\sin(-120°-\alpha°)=0 \quad \text{Eq. (22)}$$

Using the above-stated angle-sum relationship, the solution of Equations 21–22 for "a" and "b" is provided by Equations 23 and 24, respectively, it being understood that a negative turns ratio indicates that the corresponding dot of the upper half of FIG. 3 is on the opposite side of the transformer 2'.

$$a = \frac{-\sin(120°+\alpha°)}{\sin\alpha°} \quad \text{Eq. (23)}$$

$$b = \frac{\sin 120°}{\sin\alpha°} \quad \text{Eq. (24)}$$

Selecting the current $I_x$, for example, as the reference phase for the transformer 10', the turns ratio (i.e., 1:a':b') for the transformer 10' is provided by Equation 25.

$$1<0°+a'<120°+b'<(120°+\alpha°)=0 \quad \text{Eq. (25)}$$

Alternative forms of Equation 25 are provided by Equations 26 and 27.

$$a'\cos 120°+b'\cos(120°+\alpha°)=-1 \quad \text{Eq. (26)}$$

$$a'\sin 120°+b'\sin(120°+\alpha°)=0 \quad \text{Eq. (27)}$$

Equations 26 and 27 are similarly solved for "a'" and "b'", using the above-stated angle-sum relationship, in order to provide Equations 28 and 29, respectively, it being understood that a negative turns ratio (e.g., "a'" and/or "b'" being negative) indicates that the corresponding dot of the lower half of FIG. 3 is on the opposite side of the transformer 10'.

$$a' = a = \frac{-\sin(120°+\alpha°)}{\sin\alpha°} \quad \text{Eq. (28)}$$

$$b' = b = \frac{\sin 120°}{\sin\alpha°} \quad \text{Eq. (29)}$$

In a manner similar to the embodiment of FIG. 2, all harmonics, except the "M"th harmonics of Equation 18, are blocked by the pair of transformers 18' which include transformers 2' and 10'.

Those skilled in the art will appreciate that the exemplary pair of transformers 18 and 18' of FIGS. 2 and 3, respectively, may be extended to a system having any number of phases or any number of displaced current sets. Generally, an N-phase system, which has "m" displaced current sets, minimally requires N*m transformer windings (e.g., 3*2=6 windings 4,6,8,12,14,16 in the exemplary three-phase embodiment of FIG. 2). Typically, such transformer windings are provided by "m" or more N-winding transformers (e.g., two 3-winding transformers 2',10' in the exemplary three-phase embodiment of FIG. 3). Those skilled in the art will further appreciate that the exemplary pair of transformers 18 and 18' may be used to block sub-harmonic currents, except the 1/"M"th harmonic currents, where "M" is defined by Equation 18, above. Accordingly, the exemplary pair of transformers 18 and 18' block all currents except for the "M"th, the 1/"M"th and "negative sequence currents" of Equations 30A–30C. Those skilled in the art will also appreciate that other equations, equivalent to Equations 2–29, may be provided for negative sequence currents.

$$I_{na} = I(0° = \sqrt{2}\ I\cos\omega t \quad \text{Eq. (30A)}$$

$$I_{nc} = I(-120° = \sqrt{2}\ I\cos(\omega t - 120°) \quad \text{Eq. (30B)}$$

$$I_{nb} = I(120° = \sqrt{2}\ I\cos(\omega t + 120°) \quad \text{Eq. (30C)}$$

As indicated in Table I below, since the selection of the current (e.g., $I_a$) for the first winding 4 in transformer 18 is arbitrary, there are 18 equivalent arrangements of currents which provide the same turns ratio in both of the transformers 18,18'.

TABLE I

| Currents in Transformer 18 Windings | | | Currents in Transformer 18' Windings | | |
|---|---|---|---|---|---|
| 4 | 6 | 8 | 12 | 14 | 16 |
| $I_a$ | $I_b$ | $I_x$ | $I_z$ | $I_y$ | $I_c$ |
| $I_a$ | $I_b$ | $I_y$ | $I_x$ | $I_z$ | $I_c$ |
| $I_a$ | $I_b$ | $I_z$ | $I_y$ | $I_x$ | $I_c$ |
| $I_a$ | $I_c$ | $I_x$ | $I_y$ | $I_z$ | $I_b$ |
| $I_a$ | $I_c$ | $I_y$ | $I_z$ | $I_x$ | $I_b$ |
| $I_a$ | $I_c$ | $I_z$ | $I_x$ | $I_y$ | $I_b$ |
| $I_a$ | $I_x$ | $I_b$ | $I_z$ | $I_c$ | $I_y$ |
| $I_a$ | $I_x$ | $I_c$ | $I_y$ | $I_b$ | $I_z$ |
| $I_a$ | $I_x$ | $I_z$ | $I_y$ | $I_b$ | $I_c$ |
| $I_a$ | $I_y$ | $I_b$ | $I_x$ | $I_c$ | $I_z$ |
| $I_a$ | $I_y$ | $I_c$ | $I_z$ | $I_b$ | $I_x$ |
| $I_a$ | $I_y$ | $I_x$ | $I_z$ | $I_b$ | $I_c$ |
| $I_a$ | $I_y$ | $I_z$ | $I_x$ | $I_c$ | $I_b$ |
| $I_a$ | $I_z$ | $I_b$ | $I_y$ | $I_c$ | $I_x$ |
| $I_a$ | $I_z$ | $I_c$ | $I_x$ | $I_b$ | $I_y$ |
| $I_a$ | $I_z$ | $I_x$ | $I_y$ | $I_c$ | $I_b$ |
| $I_a$ | $I_z$ | $I_y$ | $I_x$ | $I_b$ | $I_c$ |

Figure 4:
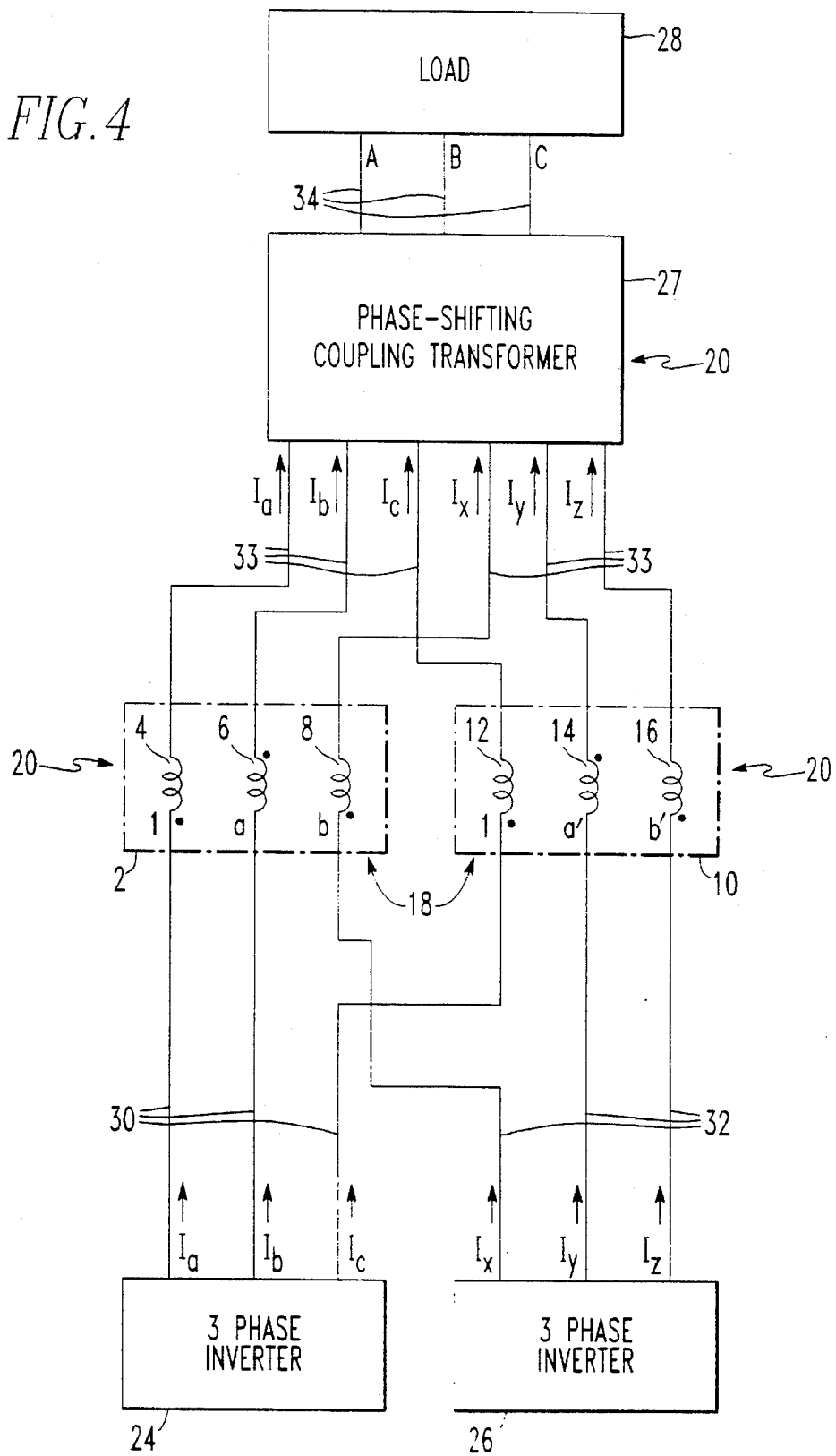
FIG. 4 is a schematic diagram of a power circuit having two three-phase transformers in accordance with the embodiment of FIG. 2.

Referring to FIG. 4, a three-phase power circuit 22 includes two exemplary three-phase inverters 24,26; the two three-winding, common-core transformers 2,10 of FIG. 2; a phase-shifting coupling transformer 27; and a three-phase load 28. The three-phase inverter 24 produces a first set of positive sequence currents $I_a$, $I_b$, $I_c$ on the three power lines 30. The three-phase inverter 26 provides three output power lines 32 which conduct a second set of currents $I_x$, $I_y$, $I_z$. The second set of currents is displaced from the first set of currents by a predetermined phase shift $\alpha$. As discussed above, each of these six currents has a fundamental frequency and a plurality of harmonic frequencies of the fundamental frequency.

Referring to FIGS. 2 and 4, each of the transformers 2 and 10 has three windings 4,6,8 and 12,14,16, respectively, and generally receives at least one current from the first current set and at least one current from the second current set. In particular, the transformer 2 receives two currents $I_a$,$I_b$ from the first set and one current $I_x$ from the second set. In a related manner, the transformer 10 receives two currents $I_y$,$I_z$ from the second set and one current $I_c$ from the first set.

The transformer 27 has six input power lines 33 for the first current set $I_a$,$I_b$,$I_c$ and for the second current set $I_x$,$I_y$,$I_z$.

The transformer 27 provides a phase shift of —α and, hence, eliminates the phase shift between the two current sets. The transformer 27 also includes three output power lines A,B,C which conduct an output current set. The power lines A,B,C, in turn, are connected to the three-phase power lines 34 of the load 28. The transformer 27 is one of various transformers such as, for example, "zig-zag", "forked wye", or "extended delta" transformers.

As illustrated in FIG. 4, the transformer 27 has six input phases 33 for receiving the first current set and the second current set from the six windings 4,6,8,12,14,16 of the pair of transformers 18. In particular, transformer 2 receives the currents $I_a, I_b$ from the three-phase inverter 24 and the current $I_x$ from the three-phase inverter 26. Transformer 2 transmits these currents $I_a, I_b, I_x$ to three of the six input phases of the transformer 27. Transformer 10 receives the current $I_c$ from the three-phase inverter 24 and the currents $I_y, I_z$ from the three-phase inverter 26. Transformer 10 transmits these currents $I_c, I_y, I_z$ to the other three of the six input phases of the transformer 27.

The exemplary magnetic filter 20 reduces the harmonic current flow in the exemplary power circuit 22 by introducing a phase shift, while maintaining equal phase currents through the transformers 2,10. As discussed above, the magnetic filter 20 filters substantially all of the plurality of harmonic frequencies (except, e.g., Equation 18) and, also, filters substantially all of the plurality of sub-harmonic frequencies.

Figure 5:
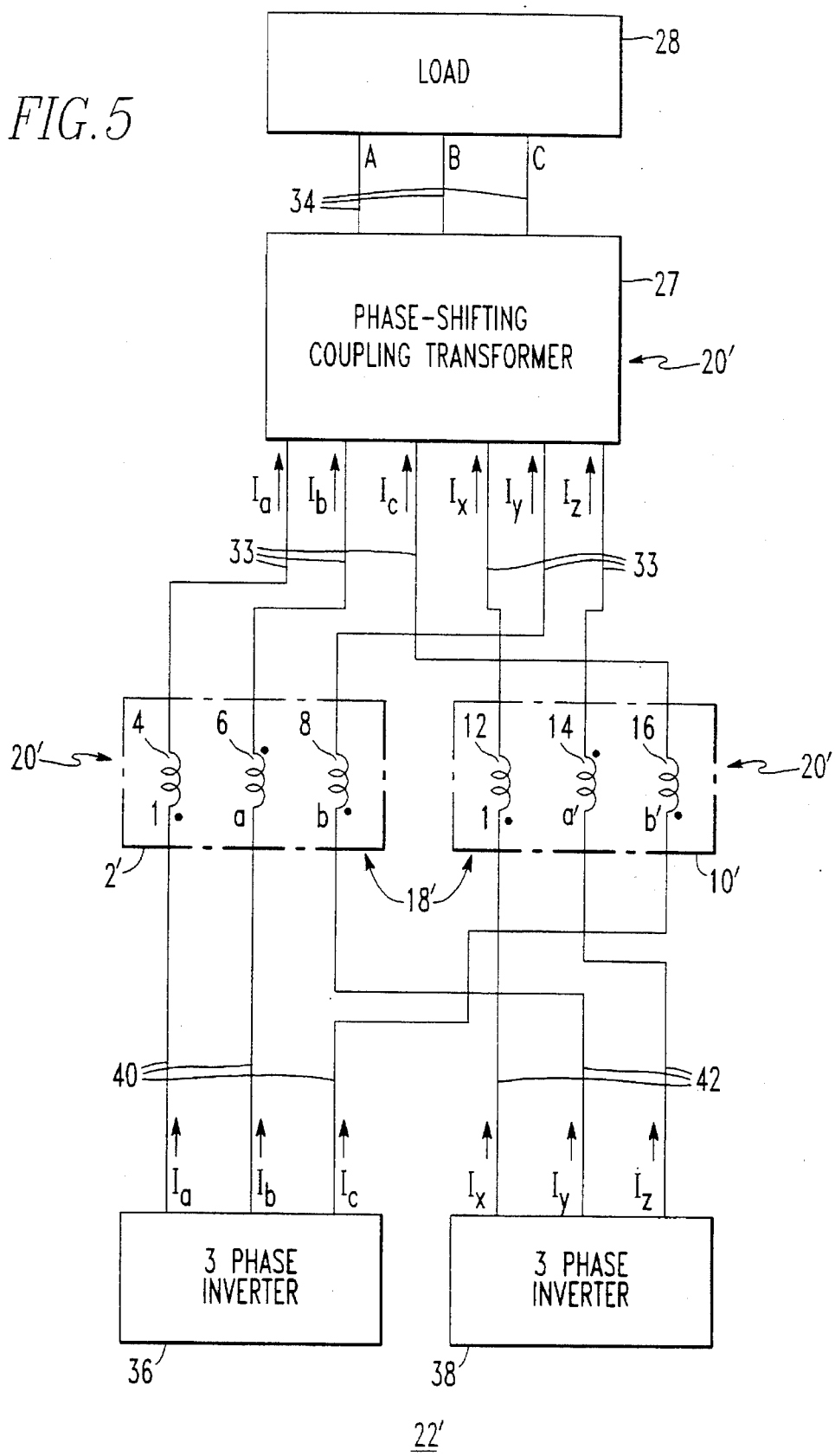
FIG. 5 is a schematic diagram of a power circuit having two three-phase transformers in accordance with the embodiment of FIG. 3.

Referring to FIG. 5, the harmonic content of the output of at least two power sources, such as the exemplary two three-phase inverters 36,38, is minimized by the magnetic filter 20' of the exemplary three-phase power circuit 22'. The power lines 40 of the inverter 36 include the first current set $I_a, I_b, I_c$. The power lines 42 of the inverter 38 include the second current set $I_x, I_y, I_z$. The alternative power circuit 22', in a manner similar to the magnetic filter 20 of FIG. 4, includes the phase-shifting coupling transformer 27.

The major difference between FIGS. 5 and 4 is the use of the pair of transformers 18' of FIG. 3 in place of the pair of transformers 18 of FIG. 2. Otherwise, as discussed above, the magnetic filter 20' filters substantially all of the plurality of harmonic frequencies (except, e.g., Equation 18) and, also, filters substantially all of the plurality of sub-harmonic frequencies. The turns ratio of the transformers 2,10 of FIG. 4 is provided by Equations 5 and 6, and the turns ratio of the transformers 2',10' of FIG. 5 is provided by Equations 23 and 24. Those skilled in the art will appreciate that the transformers 2,10 and associated current selections of FIG. 2 may be applied to the power circuit 22' of FIG. 5. Similarly, the transformers 2,10 and associated current selections of FIG. 3 may be applied to the power circuit 22 of FIG. 4.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

We claim:

1. A magnetic filter apparatus for a power circuit including a first plurality of current sets having a fundamental frequency and a second plurality of harmonic frequencies of said fundamental frequency, each of said first plurality of current sets being conducted by a third plurality of phases and being displaced from a corresponding one of said first plurality of current sets by a predetermined phase shift, said magnetic filter apparatus comprising:

a plurality of transformer means of the first plurality, each of said plurality of transformer means having windings of the third plurality for receiving at least one current from each of said first plurality of current sets; and phase shift elimination means having a plurality of input phases of the first plurality times the third plurality for receiving each of the currents of said first plurality of current sets, said phase shift elimination means also having output phases of the third plurality which conduct an output current set, said plurality of transformer means filtering substantially all of said second plurality of harmonic frequencies from the output current set.

2. The apparatus as recited in claim 1 wherein said first plurality of current sets are positive sequenced currents; wherein the predetermined phase shift is a phase angle, α, wherein a remainder of said second plurality of harmonic frequencies is not filtered from the output current set, the remainder of said plurality of harmonic frequencies is related to:

$$\left( \frac{360°}{\alpha°} \right).$$

3. The apparatus as recited in claim 2 wherein an integer, K, is greater than or equal to zero; wherein f is equal to said fundamental frequency; and wherein the remainder of said second plurality of harmonic frequencies is about equal to:

$$f * \left( \left( \frac{360°}{\alpha°} \right) * K \pm 1 \right).$$

and the integer K satisfies the requirement that $$K = \pm \left| \frac{L\alpha°}{120° - \alpha°} \right|$$

for an integer L.

4. The apparatus as recited in claim 1 wherein said first plurality of current sets are positive sequenced currents; wherein the predetermined phase shift is a phase angle, α, wherein said first plurality of current sets further have a fourth plurality of sub-harmonic frequencies of said fundamental frequency; and wherein said plurality of transformer means also filter substantially all of said fourth plurality of sub-harmonic frequencies.

5. A magnetic filter apparatus for a power circuit including a first plurality of current sets having a fundamental frequency and a second plurality of harmonic frequencies of said fundamental frequency, each of said first plurality of current sets being conducted by three phases and being displaced from a corresponding one of said first plurality of current sets by a predetermined phase shift, said magnetic filter apparatus comprising:

transformer means of the first plurality, each of said plurality of transformer means having three windings for receiving at least one current from each of said first plurality of current sets; and phase shift elimination means having a plurality of input phases of thrice the first plurality for receiving each of the currents of said first plurality of current sets, said phase shift elimination means also having three output phases which conduct an output current set, said plurality of transformer means filtering substantially all of said second plurality of harmonic frequencies from the output current set.

6. A magnetic filter apparatus for a three-phase power circuit having two inverters, including a first inverter having three power lines which conduct three currents in a first current set, and including a second inverter having three power lines which conduct three currents in a second current set that is displaced from the first current set by a predetermined phase shift; each of the first current set and the second current set has a fundamental frequency and a plurality of harmonic frequencies of said fundamental frequency, said magnetic filter apparatus comprising:

two transformer means, each of said two transformer means having three windings, a first transformer means receiving two currents from the first current set and one current from the second current set, and a second transformer means receiving one current from the first current set and two currents from the second current set; and phase shift elimination means having six input phases for receiving the first current set and the second current set from the three windings of each of said two transformer means, said phase shift elimination means also having three output phases which conduct an output current set, said two transformer means filtering substantially all of said plurality of harmonic frequencies from the output current set.

7. The apparatus as recited in claim 6 wherein said three currents are positive sequenced currents; wherein the second current set is displaced from the first current set by a phase angle, $\alpha$, wherein a remainder of said plurality of harmonic frequencies is not filtered from the output current set; wherein said three currents further have a second plurality of sub-harmonic frequencies of said fundamental frequency; wherein said two transformer means also filter substantially all of said second plurality of sub-harmonic frequencies; wherein a remainder of said second plurality of sub-harmonic frequencies is not filtered from the output current set; wherein an integer, K, is greater than or equal to zero; and wherein f is equal to said fundamental frequency, the remainder of said plurality of harmonic frequencies is about equal to:

$$f * \left( \left( \frac{360°}{\alpha°} \right) * K \pm 1 \right), \text{ and}$$

the remainder of said second plurality of sub-harmonic frequencies is about equal to:

$$\frac{f}{\left( \left( \frac{360°}{\alpha°} \right) * K \pm 1 \right)}.$$

and the integer K satisfies the requirement that $$k = \pm \left| \frac{L\alpha°}{120° - \alpha°} \right|$$

for an integer L.

8. The apparatus as recited in claim 6 wherein each of said two transformer means has a magnetizing reactance and a leakage reactance which is substantially smaller than the magnetizing reactance; wherein a remainder of said plurality of harmonic frequencies is not filtered from the output current set; wherein said substantially all of said plurality of harmonic frequencies are blocked by the magnetizing reactance; and wherein said fundamental frequency and the remainder of said plurality of harmonic frequencies are passed by the leakage reactance.

9. The apparatus as recited in claim 6 wherein said three currents are positive sequenced currents; wherein each of said two transformer means having three windings has a first turns ratio between a second winding and a first winding, and a second turns ratio between a third winding and the first winding; and wherein the second current set is displaced from the first current set by a phase angle, $\alpha$, the first turns ratio being about equal to:

$$\frac{\sin\alpha°}{\sin(120° - \alpha°)}, \text{ and}$$

the second turns ratio being about equal to:

$$\frac{\sin 120°}{-\sin(120° - \alpha°)}.$$

10. A magnetic filter apparatus for a three-phase power circuit having three power lines which conduct three currents in a first current set, each of said three currents in the first current set has a fundamental frequency and a plurality of harmonic frequencies of said fundamental frequency, and also having three power lines which conduct three currents in a second current set that is displaced from the first current set by a predetermined phase shift; said magnetic filter apparatus comprising:

two transformer means, each of said two transformer means having three windings, a first transformer means receiving two currents from the first current set and one current from the second current set, and a second transformer means receiving one current from the first current set and two currents from the second current set; and phase shift elimination means having six input phases for receiving the first current set and the second current set from the three windings of each of said two transformer means, said phase shift elimination means also having three output phases which conduct an output current set, said two transformer means filtering substantially all of said plurality of harmonic frequencies from the output current set.

11. The apparatus as recited in claim 10 wherein each of said two transformer means having three windings has a first turns ratio between a second winding and a first winding, and a second turns ratio between a third winding and the first winding; wherein said three currents are positive sequenced currents; and wherein the second current set is displaced from the first current set by a phase angle, $\alpha$, the first turns ratio being about equal to:

$$\frac{-\sin(120° + \alpha°)}{\sin\alpha°}, \text{ and}$$

the second turns ratio being about equal to:

$$\frac{\sin 120°}{\sin\alpha°}.$$

12. The apparatus as recited in claim 10 wherein said three currents are positive sequenced currents; wherein the second current set is displaced from the first current set by a phase angle, $\alpha$; and wherein a remainder of said plurality of harmonic frequencies is not filtered from the output current set, the remainder of said plurality of harmonic frequencies is related to:

$$\left(\frac{360°}{\alpha°}\right).$$

13. The apparatus as recited in claim 12 wherein an integer, K, is greater than or equal to zero; wherein f is equal to said fundamental frequency; and wherein the remainder of said plurality of harmonic frequencies is about equal to:

$$f*\left(\left(\frac{360°}{\alpha°}\right)*K\pm 1\right).$$

and the integer K satisfies the requirement that $$k=\pm\left|\frac{L\alpha°}{120°-\alpha°}\right|$$

for an integer L.

14. The apparatus as recited in claim 10 wherein said three currents are positive sequenced currents; wherein the second current set is displaced from the first current set by a phase angle, $\alpha$; wherein said three currents further have a second plurality of sub-harmonic frequencies of said fundamental frequency; and wherein said two transformer means also filter substantially all of said second plurality of sub-harmonic frequencies.

15. The apparatus as recited in claim 14 wherein a remainder of said second plurality of sub-harmonic frequencies is not filtered from the output current set; wherein an integer, K, is greater than or equal to zero; and wherein f is equal to said fundamental frequency, the remainder of said second plurality of sub-harmonic frequencies is about equal to:

$$\frac{f}{\left(\left(\frac{360°}{\alpha°}\right)*K\pm 1\right)}.$$

and the integer K satisfies the requirement that $$k=\pm\left|\frac{L\alpha°}{120°-\alpha°}\right|$$

for an integer L.

16. The apparatus as recited in claim 10 wherein said three currents are positive sequenced currents; wherein the second current set is displaced from the first current set by a phase angle, $\alpha$; wherein a remainder of said plurality of harmonic frequencies is not filtered from the output current set; wherein said three currents further have a second plurality of sub-harmonic frequencies of said fundamental frequency; wherein said two transformer means also filter substantially all of said second plurality of sub-harmonic frequencies;

wherein a remainder of said second plurality of sub-harmonic frequencies is not filtered from the output current set; wherein an integer, K, is greater than or equal to zero; and wherein f is equal to said fundamental frequency, the remainder of said plurality of harmonic frequencies is about equal to:

$$f*\left(\left(\frac{360°}{\alpha°}\right)*K\pm 1\right), \text{ and}$$

the remainder of said second plurality of sub-harmonic frequencies is about equal to:

$$\frac{f}{\left(\left(\frac{360°}{\alpha°}\right)*K\pm 1\right)}.$$

and the integer K satisfies the requirement that $$k=\pm\left|\frac{L\alpha°}{120°-\alpha°}\right|$$

for an integer L.

17. The apparatus as recited in claim 10 wherein each of said two transformer means has a magnetizing reactance and a leakage reactance which is substantially smaller than the magnetizing reactance; wherein a remainder of said plurality of harmonic frequencies is not filtered from the output current set; wherein said substantially all of said plurality of harmonic frequencies are blocked by the magnetizing reactance; and wherein said fundamental frequency and the remainder of said plurality of harmonic frequencies are passed by the leakage reactance.

18. The apparatus as recited in claim 10 wherein said three currents are positive sequenced currents; wherein each of said two transformer means having three windings has a first turns ratio between a second winding and a first winding, and a second turns ratio between a third winding and the first winding; and wherein the second current set is displaced from the first current set by a phase angle, $\alpha$, the first turns ratio being about equal to:

$$\frac{\sin\alpha°}{\sin(120°-\alpha°)}, \text{ and}$$

the second turns ratio being about equal to:

$$\frac{\sin 120°}{-\sin(120°-\alpha°)}.$$

\* \* \* \* \*